Feb. 27, 1968      G. MEYER      3,370,872

BALL JOINT

Filed Nov. 30, 1965

INVENTOR.
GEORG MEYER

BY

McGlew & Toren
ATTORNEYS.

United States Patent Office 3,370,872
Patented Feb. 27, 1968

3,370,872
BALL JOINT
Georg Meyer, Kreis Diepholz, Germany, assignor to Lemforder Metallwaren A.G., Lemforde, Hannover, Germany
Filed Nov. 30, 1965, Ser. No. 510,622
Claims priority, application Germany, Dec. 23, 1964, L 49,595
8 Claims. (Cl. 287—90)

ABSTRACT OF THE DISCLOSURE

A universal joint includes a hinge pin having a hemispherical outer form which rides in a hemispherical cavity of a housing and includes a hemispherical recess which receives a ball-shaped end of a ball member which is made of a resilient material and which is releasably engaged in an opening of a flat cover plate for the housing. The ball member is pretensioned so that it is axially biased in a direction to force its head into engagement with the semi-spherical recess of the hinge pin.

---

This invention relates, in general, to a mechanical joint construction and, in particular, to a new and useful universal joint having a pressure ball member which is contained on a closing plate for the socket member.

The present invention is particularly applicable to universal joints which may be used, for example, in steering mechanisms of automobiles. The joint inclueds a hinge pin which is elastically supported in the universal joint housing and with the inventive construction a ball member or pressure piece is mounted for movement in all directions within a cover plate which is arranged to close a socket housing which receives the socket head portion of the hinge pin. The construction is such that the pressure piece ball member is resiliently held in the cover and biased into the socket portion of the hinge pin in a manner permitting it to be moved in all directions free from play and to provide an automatic means for adjusting the joint.

The present invention is an improvement over the prior art particularly in respect to the improved joint construction, which makes it possible to assemble and remove the elastic pressure piece or ball member from the housing in a simple manner. The ball member alone may be removed in case it becomes worn to an extent that the self-adjustment of the joint is not satisfactory and it may be either readjusted or completely replaced. A further feature of the invention is that it provides an inexpensive construction which is easy to assemble and requires a minimum of material and labor.

In accordance with the invention, the universal joint includes a socket housing portion in which is positioned a semi-spherical head portion of a hinge pin which is rotatable in all directions on suitable bearing surface defined in the housing. The upper half of the head portion is provided with a semi-spherical recess to receive a ball-shaped head of a pressure piece, which in accordance with the invention, is mounted integrally on a closing plate for the lower socket portion of the housing. The pressure piece is advantageously of elastic material or a portion thereof is made flexible or resilient. Preferably the upper portion is constructed so that it may be elastically deformed and then pretensioned in an opening in the housing cover plate. To facilitate installation, the elastic pressure piece is provided with an annular recess adjacent its top which after initial deformation is permitted to expand under pretensioning against the walls of the cover plate. The construction makes it particularly simple to assembly the joint since it is only necessary to insert the pin into the lower socket housing and thereafter to close the housing with a cover plate having the pressure piece thereon after it is aligned in the semi-spherical recess of the head portion of the hinge pin by similar deformation and insertion from the top. Thus, after the hinge pin is assembled in the joint, there is no need to disassemble the joint or to remove the cover plate, and hence the lubricant and all of the operating parts with the exception of the pressure pin may remain sealed within the housing.

A further feature of the construction is that the pressure piece is designed so that it is under initial stress in the assembled state and is retained on the cover plate mounting with the necessary contact pressure against the hinge pin. The construction provides a play-free support and automatic readjustment of all the joint parts and tight seal of the joint housing. In order to avoid molecular stress of the pressure piece, the part is made of a material having good sliding characteristics preferably a polyurethane plastic. When polyurethane plastic is employed, it is preferable that the surface which is in bearing contact in the recess of the head portion of the hinge pin be made of a more durable material and in some instances is provided with a sliding layer. In addition, the interior surface of the hinge pin in which the pressure piece head portion is slidable may be provided with a layer of lubricating material.

According to another feature of the invention, the pressure piece is advantageously made of several different layers of material of different hardness. In this way, it is possible, for example, to make the parts arranged in the sliding zone of the pressure piece of a harder material having good sliding properties while a softer material with a high elasticity can be selected for the part facing the housing cover. For the same reason, it is advantageous to make the pressure piece of layers having materials of different structure. Thus, the lower part of the pressure piece can be made of a homogeneous material while the upper part facing the cover can advantageously comprise a cell-elastic material. Another feature of the construction is that a lubricating chamber is formed between the socket portion of the housing and the cover. The upper surface of the hinge pin head is located in spaced relationship to the cover to provide space for this purpose. A large amount of lubricant can be contained in the housing for permanent lubrication in this manner.

Accordingly, it is an object of the invention to provide a universal joint having a lower socket portion housing for a hinge pin head portion which is covered by a cover member having a pressure piece with a ball surface which is adapted to be positioned within a recess defined in the head portion of the hinge pin.

A further object of the invention is to provide a universal joint having a construction which includes a ball member or pressure piece which is mounted in the cover such that it may be elastically deformed for easy insertion, removal or re-alignment.

A further object of the invention is to provide a universal joint having a housing construction in which a space is defined between a cover member and a socket portion of the housing for lubricant and wherein the cover may be permanently secured to the socket portion of the housing.

A further object of the invention is to provide a universal joint construction which includes a ball member or pressure piece which is elastically pretensioned within an opening defined in the cover plate of the joint housing and wherein the ball member is made of layers of material of different hardness so that the ball head portions thereof, for example, may be made of durable material for facilitating sliding engagement with a recess of a hinge pin while the exterior upper portion of the ball member may be made of elastic material to facilitate its installation and removal in a cover member.

A further object of the invention is to provide a universal joint construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
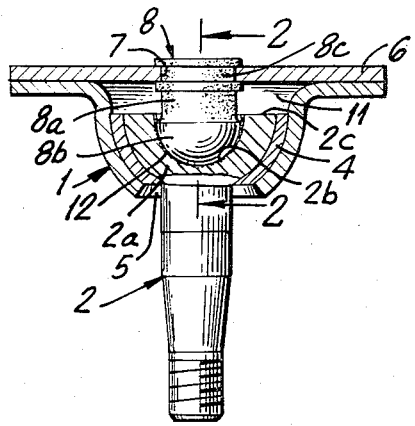
FIG. 1 is a transverse sectional view of a universal joint constructed in accordance with the invention.
Figure 2:
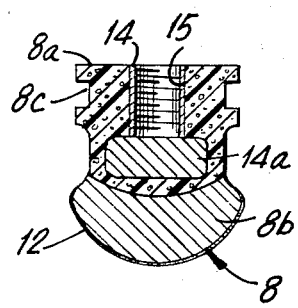
FIG. 2 is a sectional view taken along the line 2—2 of FIG. 1.

Referring to the drawings, in particular, the invention embodied therein in FIGS. 1 and 2 comprises a universal joint with a socket forming housing portion generally designated 1 in which is positioned a semi-spherical head portion 2a of a hinge pin generally designated 2. The semi-spherical outer surface of the head portion 2a is slidable in all directions on the surface of bearing box or shell 4 made of a metal or any other suitable bearing sliding material.

In accordance with the invention, the head portion 2a of the hinge pin 2 is provided with a semi-spherical recess 2b for receiving a spherical or ball-shaped head portion 8b of a pressure piece or ball member generally designated 8.

In accordance with a feature of the invention, the ball member 8 includes an upper half 8a which is advantageously made of elastic material to facilitate its deformation and insertion in a bore 7 of a cover plate 6 for the joint housing.

In accordance with another feature of the invention, the joint is assembled by dropping the hinge pin 2 through an opening 5 defined in the lower housing portion 1. The ball member 8 which includes an upper annular groove 8c is deformed, that is, by compressing the outer wall inwardly to permit it to be inserted into the bore 7 of the cover plate 6. The flanges on each side of the recess 8c provide a centering and holding means for the ball member 8 in the cover 6. The cover 6 is thereafter assembled to the lower housing portion 1 at a location so that the ball-shaped end 8b is oriented within the recess 2b of the head portion 2a of the hinge pin 2. Thereafter the cover 6 is permanently secured to the housing 1 such as by permanent welding or by bolts or similar securing means. The ball member 8 is held to the cover 6 so firmly that it cannot move from its mounting under these stresses normally appearing in operation. However, it can be removed upwardly from the cover plate 6 by the inward deformation of the sides of the member. In order to facilitate insertion and withdrawal, the pressure member 8 is advantageously made with a hollowed interior or bore 15 opening on the top which is advantageously provided with a sleeve or insert 14 having a widened head portion 14a which is inserted well within the opening defined in the ball member 8 and holds the sleeve 14 in position. The sleeve 14 is advantageously threaded to receive a similarly threaded insertion tool to permit engagement of the tool for the removal of the ball member upwardly through the opening 7 of the cover 6. Because the pressure piece 8 is inserted under initial stress, which acts in a radial direction, a reliable seal is achieved with the cover plate 6 and the collar formations on each side of the annular groove 8c provide a firm positioning means and seal.

In the embodiments of FIGS. 1 and 2, the lower portion 8b of the ball member 8 is advantageously made of a durable material such as metal which is formed of a hemispherical outer surface complementary to the surface 2b of the hinge pin 2. In some instances, it is desirable to provide an exterior surface of a complete formation of the part 8b of a material having relatively low friction to facilitate sliding of this surface with the hemispherical surface 2b. In other instances, it is desirable to add a lubricant such as a molybdenum sulphide or similar material or a thin layer of a material 12 which is provided within the range of the contact between the ball 8b and the hemispherical recess 2b. The upper surface 2c of the hinge pin 2 terminates below the top of the lower portion of the housing 1 so that a lubricating chamber 11 is defined between this top surface and the cover 6. A permanent lubricant may be located in this space since the cover 6 will normally be secured to the housing 1 during the lifetime of the device.

The clearance height of the cover plate 6 with the top surface 2c and the inner surface 2b of the hinge pin 2 is such that the ball member 8 is pretensioned in an axial direction so that it cannot be easily pulled out of its mounting in the plate during the angular movements of the hinge pin 2.

Figure 3:
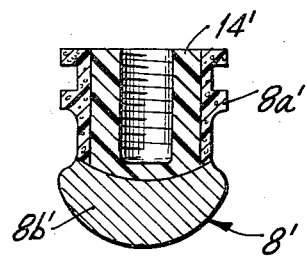
FIG. 3 is a view similar to FIG. 2 of another embodiment of the pressure piece.

In the embodiment of FIGS. 1 and 2, the ball member 8 is made of many layers with the upper portion 8a being of an elastic or resilient material having better sliding properties. The upper part 8a may be of a material such as cell-elastic plastic. The sleeve 14 is advantageously made of a metal or any other suitable material having a female thread which may be firmly anchored within the resilient material of the portion 8a. It may, for example, comprise a hard plastic material in some instances such as at 14' in FIG. 3. Its purpose is to provide means for engagement by a tool provided with a male thread.

While specific embodiments of the invention have been shown and described in detail to illustrate the application of the inventive principles, it will be understood that the invention may be embodied otherwise without departing from such principles.

What is claimed is:

1. A universal joint comprising, a housing having a socket portion with an opening therethrough, a hinge pin extending through the opening and having a spherically-shaped head portion slidably held in said socket portion and having a semi-spherical recess defined in an end thereof, a cover plate covering said housing and secured thereto, said cover plate having a wall with an opening therethrough aligned with the recess of said head portion, and a ball member at least a portion of which is made of an elastically deformable material which includes a groove defined therearound which is elastically releasably engaged around the wall bounding the opening of said cover plate whereby to permit the deformation for insertion and removal of said ball member in said cover, said ball member extending through the opening of said cover and having a ball-shaped end slidably engaged with the semi-spherical recess of said head portion of said hinge pin, said ball member being pretensioned in an axial direction to urge the ball-shaped end into engagement with the semi-spherical recess of said head portion of said hinge pin.

2. A universal joint, according to claim 1, including a lining of bearing material in said housing socket portion engaged with the spherically-shaped head portion of said hinge pin.

3. A universal joint, according to claim 1, wherein said cover is welded to said housing socket portion.

4. A universal joint, according to claim 1, wherein the cover is spaced from said hinge pin head portion to define a lubricating chamber within said socket portion of said housing.

5. A universal joint, according to claim 1, wherein said ball member is made of a plurality of layers of material with the upper outer portion being engaged with said cover plate being of a deformable elastic material and a lower portion being made of a harder material for facilitating sliding engagement in the semi-spherical recess of said head portion.

6. A universal joint, according to claim 5, including a layer of lubricating material located between the ball-shaped end of said ball member and the semi-spherical recess of the head portion of said hinge pin.

7. A universal joint comprising, a housing having a socket portion with an opening therethrough, a hinge pin extending through the opening and having a spherically-shaped head portion slidably held in said socket portion and having a semi-spherical recess defined in an end thereof, a cover plate having an opening therethrough aligned with the recess of said head portion, and a ball member releasably secured to said cover plate and extending through the opening thereof and having a ball-shaped end slidably engaged with the semi-spherical recess of said head portion of said hinge pin, said ball member including at least a portion thereof made of deformable elastic material, said ball member being deformable for insertion and withdrawal through the opening of said cover plate, and means defining engageable thread elements within said ball member accessible from the exterior of said cover for engagement by a tool for removal of said ball member.

8. A universal joint comprising, a housing having a socket portion with an opening therethrough, a hinge pin extending through the opening and having a spherically-shaped head portion slidably held in said socket portion and having a semi-spherical recess defined in an end thereof, a cover plate covering said housing and secured thereto, said cover plate having an opening therethrough aligned with the recess of said head portion, and a ball member releasably secured to said cover plate and extending through the opening thereof and having a ball-shaped end slidably engaged with the semi-spherical recess of said head portion of said hinge pin, said ball member being made with a deformable upper portion to facilitate engagement with and removal from said cover and including an annular recess defined therearound which engages the wall of the cover around the opening thereof, said ball member having a bore defined therethrough accessible from the exterior of the cover, and a metallic member having an internal thread positioned in the bore of said member and secured to said ball member for receiving a similarly threaded tool for insertion, alignment and removal of said ball member.

References Cited

UNITED STATES PATENTS

| | | | |
|---|---|---|---|
| 1,788,083 | 1/1931 | Church | 287—90 |
| 2,206,972 | 7/1940 | Niles | 287—90 |
| 2,571,281 | 10/1951 | Neher. | |
| 2,707,645 | 5/1955 | Moskovitz | 287—90 |
| 2,885,248 | 5/1959 | White | 287—90 |
| 3,103,377 | 9/1963 | Scheublein et al. | |

FOREIGN PATENTS 1,098,382  1/1961  Germany.

CARL W. TOMLIN, *Primary Examiner.*

A. V. KUNDRAT, *Assistant Examiner.*